United States Patent [19]

Weber et al.

[11] 4,268,755
[45] May 19, 1981

[54] FUEL ASSEMBLY SHIPPING CASK

[75] Inventors: Robert Weber, Uttenreuth; Stefan Ring; Ulf Heeschen, both of Erlangen, all of Fed. Rep. of Germany

[73] Assignee: Kraftwerk Union Aktiengesellschaft, Mülheim an der Ruhr, Fed. Rep. of Germany

[21] Appl. No.: 55,918

[22] Filed: Jul. 9, 1979

[30] Foreign Application Priority Data

Jul. 10, 1978 [DE] Fed. Rep. of Germany ....... 2830305

[51] Int. Cl.³ .............................................. G21F 5/00
[52] U.S. Cl. .................................... 250/506; 250/507
[58] Field of Search ................. 250/506, 507; 176/81, 176/38, 87; 188/1 C

[56] References Cited

U.S. PATENT DOCUMENTS

| 3,309,283 | 3/1967 | Alfille | 176/81 |
| 3,675,746 | 7/1972 | Irvine | 188/1 C |
| 3,719,255 | 3/1973 | Daniels et al. | 188/1 C |
| 3,917,953 | 11/1975 | Wodrich | 250/506 |
| 4,088,897 | 5/1978 | Soot | 250/507 |

FOREIGN PATENT DOCUMENTS

| 2744596 | 4/1978 | Fed. Rep. of Germany | 188/1 C |
| 18213 | of 1911 | United Kingdom | 188/1 C |

Primary Examiner—Bruce C. Anderson
Attorney, Agent, or Firm—Herbert L. Lerner

[57] ABSTRACT

In combination, a fuel assembly transfer cask having lifting devices and a shock-absorbing piston member associated with the underside of the transfer cask, the piston member including two mutually spaced-apart metal plates, a multiplicity of hollow metal bodies stacked on top of one another therebetween and fastening elements for fastening the piston member to the lifting devices.

8 Claims, 3 Drawing Figures

FUEL ASSEMBLY SHIPPING CASK

The invention relates to a fuel assembly shipping or transfer cask with a shock-absorbing piston member associated with the underside of the transfer cask.

According to German Published Nonprosecuted Application DE-OS No. 22 53 232, the piston member can be formed of springs disposed between relatively displaceable parts or gas-filled bags or bladders.

A relatively great amount of elasticity is produced therewith, however, so that forces acting when a transfer cask falls, though being shifted in time, are nevertheless not reduced to the desired extent.

It is accordingly an object of the invention to provide a fuel assembly transfer or shipping cask having a shock-absorbing piston member which is of such construction as to avoid the foregoing disadvantage of the corresponding heretofore known device of this general type.

With the foregoing and other objects in view, there is provided, in accordance with the invention, in combination, a fuel assembly transfer cask having lifting devices and a shock-absorbing piston member associated with the underside of the transfer cask, the piston member comprising two mutually spaced-apart metal plates, a multiplicity of hollow metal bodies stacked on top of one another therebetween and fastening elements for fastening the piston member to the lifting devices. If the transfer cask should then fall, a deformation of the hollow bodies would result. Energy would consequently be consumed, so that the forces generated upon impact of the cask, would not be merely temporarily but entirely reduced. The falling transfer cask would thus be gently decelerated and would not rebound elastically.

In accordance with the invention, the hollow bodies of metal are tubes which are stacked cross-wise on top of one another as in shock absorbers of heretofore known type. However, they may also be metal sheets which are provided with corrugations or beads so that, when the metal sheets are stacked, cavities enclosed or defined by thin metal walls are likewise produced. Slit or slotted metal sheets, which are stretched or drawn apart to form a grid and, in this form, likewise stacked on top of one another, can, furthermore, be used as the hollow bodies. It is essential that a material with relatively great deformation energy be used which can experience or withstand a great amount of plastic elongation or expansion before it breaks, and that, through the hereinafore-mentioned cavities, space is provided for this plastic elongation or expansion. The metal sheets thus provide for the most uniformly possible loading of the volume occupied by the hollow bodies.

In accordance with another feature of the invention, the piston member has guide strips at the periphery thereof. In accordance with a preferred feature of the invention, the guide strips are formed of plastic material because low friction at the guidance surfaces is obtainable thereby. Because of the slight rigidity or stiffness thereof, plastic strips, furthermore, do not impair the damping action.

In the interest of deformability, and in accordance with a further feature of the invention, the hollow bodies are enclosed in a sheathing connecting the metal plates, the sheathing being formed with corrugations or beads extending parallel to the planes of the plates.

In accordance with an added feature of the invention, the piston member has a side thereof facing toward the transfer cask, and projections are located at the piston-member side. Only relatively small contact areas between the piston member and the transfer cask are thereby provided at which contaminating particles can be pressed into the piston member or the transfer cask. In accordance with an additional feature of the invention, the projections are formed of spacer strips disposed on the side of the piston member, the spacer strips being also exchangeable, if necessary.

The fastening of the piston member should be readily releasable. It is also advantageous and in accordance with a concomitant feature of the invention for the fastening elements are associated or connected with the transfer cask with play in such a manner that a force pressing the piston member against the transfer cask is applied directly thereto through the metal plates. This prevents the force, which is to be transmitted by the shock absorber to the transfer cask in the event of a fall of the transfer cask, from being applied at the lifting devices alone.

Other features which are considered as characteristic for the invention are set forth in the appended claims.

Although the invention is illustrated and described herein as embodied in a fuel assembly shipping cask, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompany drawings, in which.

Figure 1:
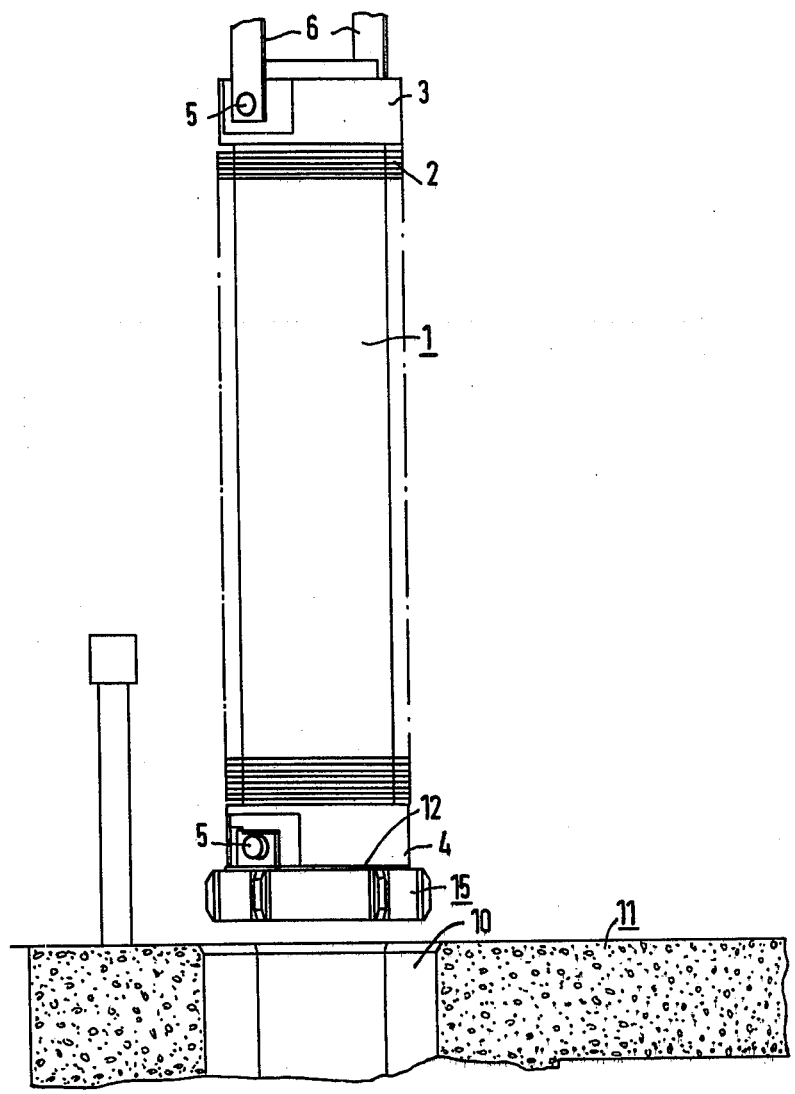
FIG. 1 is a side elevational view of the fuel assembly transfer cask according to the invention.
Figure 2:
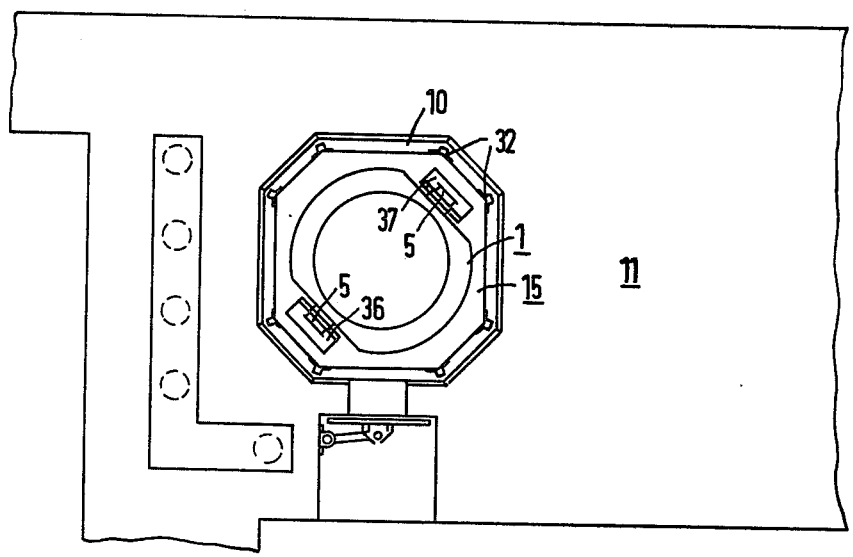
FIG. 2 is a top plan view of FIG. 1.

Referring now to the figures of the drawing, there is shown therein a transfer or shipping cask 1 for fuel assemblies of light-water reactors which, in accordance with the invention, is a cylindrical body which is equipped with fins 2 disposed about the periphery thereof and extending over the major part of the length thereof. Lifting pins 5 are mounted on end pieces 3 and 4 of the transfer cask 1 at opposite sides thereof, as shown in FIG. 2. Straps 6 of an otherwise non-illustrated lifting device engage the lifting pins 5 located at the upper end piece 3 of the transfer cask 1, as shown in FIG. 1.

For loading and unloading, the transfer cask 1 is lowered into a well 10 which is formed by the concrete walls 11 of an otherwise non-illustrated reactor building. As shown in FIG. 2, the well 10 has an octagonal cross section. It is filled with water which brakes the fall of the transfer cask 1. To increase or amplify the damping effect, as is described in the hereinaforementioned German Published Non prosecuted Application DE-OS No. 22 53 232, a piston member 15 having an octagonal cross section matching that of the well 10 is fastened to the underside 12 of the transfer cask 1.

Figure 3:
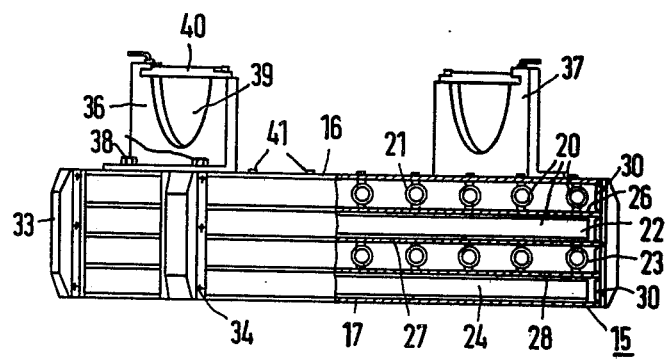
FIG. 3 is an enlarged fragmentary view of FIG. 1 showing the piston part thereof partly in section.

The piston member 15 is formed of two steel plates 16 and 17 which, having a thickness of 20 mm, are considerably more rigid than a multiplicity of cylindrical steel tubes 20 which are disposed therebetween, the tubes 20 having a wall thickness of 4 mm, and being stacked in four layers 21, 22, 23 and 24 in alternating, crosswise manner on top of one another. Between the layers 21 to 24, three thinner steel plates 26, 27 and 28 are disposed, connected to one another at the outer edge thereof and to the plates 16 and 17 by sheathing sheets or shell plates 30. As can be seen in FIG. 3, the sheathing sheets 30 are formed with depressions extending parallel to the plane of the plates 16 and 17. The sheathing sheets 30 are formed of such thin material that the rigidity or stiffness thereof is considerably less than that of the tubes 20.

At the corners 32 of the octagonal piston member 15, guide strips 33 formed of plastic material are fastened. For this purpose, screws indicated by crosses 34 are screwed into the end face of the plates 16 and 17 and the middle steel plate 27. On the upper side of the piston member 15, as shown in FIG. 3, i.e. on the plate 16, two support frames 36 and 37 are fastened by screws 38. The support frames 36 and 37 are formed with notches or cutouts 39 which can be closed by a hinged bracket 40. By means of the support frames 36 and 37, the piston member 15 can be fastened to the lifting pin 5 of the lower end piece 4 of the transfer cask 1, as is shown especially in FIG. 1. Spacer strips 41 ensure that the piston member 15 engages the transfer cask 1 only at definite locations, while the cutouts 39 ensure play or clearance at the lifting pins 5.

The piston member 15, in the embodiment described and illustrated herein, has a maximal deformation force of about 460 Mp (megapond) i.e. 460,000 kg, for a deformation distance of about 22 cm. This maximal deformation force is the greatest stress which can be exerted by the falling transfer cask 1 upon the reactor building.

There are claimed:

1. In combination, a fuel assembly transfer cask having lifting devices and a shock-absorbing piston member associated with the underside of the transfer cask, the piston member comprising two mutually spaced-apart metal plates, a multiplicity of hollow metal bodies stacked on top of one another therebetween and fastening elements for fastening the piston member to the lifting devices.

2. The combination according to claim 1 wherein the piston member has guide strips at the periphery thereof.

3. The combination according to claim 2 wherein said guide strips are formed of plastic material.

4. The combination according to claim 1 wherein said hollow bodies are enclosed in a sheathing connecting said metal plates, said sheathing being formed with corrugations extending parallel to the planes of said plates.

5. The combination according to claim 1 wherein said hollow bodies are enclosed in a sheathing connecting said metal plates, said sheathing being formed with beads extending parallel to the planes of said plates.

6. The combination according to claim 1 wherein the piston member has a side thereof facing toward the transfer cask, and including projections located at said piston-member side for spacing said side from the transfer cask.

7. The combination according to claim 6 wherein said projections are formed of spacer strips disposed on said side of the piston member.

8. The combination according to claim 1 wherein said fastening elements are connected with play to said lifting devices of the transfer cask.

* * * * *